(12) United States Patent
Li

(10) Patent No.: US 12,028,724 B2
(45) Date of Patent: Jul. 2, 2024

(54) METHOD AND DEVICE FOR CONFIGURING NETWORK PARAMETER AND COMPUTER-READABLE STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 554 days.

(21) Appl. No.: 17/285,438

(22) PCT Filed: Oct. 24, 2018

(86) PCT No.: PCT/CN2018/111740
§ 371 (c)(1),
(2) Date: Apr. 14, 2021

(87) PCT Pub. No.: WO2020/082278
PCT Pub. Date: Apr. 30, 2020

(65) Prior Publication Data
US 2021/0392520 A1    Dec. 16, 2021

(51) Int. Cl.
*H04W 24/04*    (2009.01)
*H04W 72/044*    (2023.01)
*H04W 72/23*    (2023.01)

(52) U.S. Cl.
CPC ......... *H04W 24/04* (2013.01); *H04W 72/044* (2013.01); *H04W 72/23* (2023.01)

(58) Field of Classification Search
CPC ............. H04W 52/0216; H04W 24/04; H04W 52/0235; H04B 1/56
See application file for complete search history.

(56) References Cited

U.S. PATENT DOCUMENTS

2013/0301500 A1* 11/2013  Koc ................... H04W 72/542
                                                             370/311
2014/0018085 A1   1/2014  Young et al.
(Continued)

FOREIGN PATENT DOCUMENTS

CN         108616330 A      10/2018

OTHER PUBLICATIONS

OA for IN application 202147021588, mailed on Feb. 24, 2022.
Search Report for EP application 18938085.0, mailed on May 12, 2022.

*Primary Examiner* — Yee F Lam
(74) *Attorney, Agent, or Firm* — Syncoda LLC; Feng Ma

(57) ABSTRACT

A method for configuring a network parameter includes: transmitting, by a terminal device, a configuration change request to a base station through a first physical layer resource, the first physical layer resource being a physical layer resource corresponding to a first network configuration parameter, and the first network configuration parameter being a target network configuration parameter requested by the terminal device; receiving a configuration change response from the base station, the configuration change response for indicating whether to employ the first network configuration parameter to adjust network parameter configuration; and determining whether to adjust the network parameter configuration based on the configuration change response.

18 Claims, 7 Drawing Sheets

(56) References Cited

U.S. PATENT DOCUMENTS

| | | | |
|---|---|---|---|
| 2014/0036794 A1* | 2/2014 | Koc | H04W 52/0209 370/329 |
| 2014/0044029 A1* | 2/2014 | Chou | H04W 52/0216 370/331 |
| 2014/0092799 A1* | 4/2014 | Jain | H04W 72/044 370/311 |
| 2015/0156719 A1* | 6/2015 | Quan | H04W 52/0212 370/311 |
| 2015/0230179 A1* | 8/2015 | Gupta | H04W 74/0858 370/311 |
| 2015/0304883 A1* | 10/2015 | Tabet | H04W 28/0289 370/238 |
| 2016/0057738 A1* | 2/2016 | Lee | H04W 68/005 370/329 |
| 2016/0066272 A1* | 3/2016 | Lee | H04W 52/0229 370/311 |
| 2016/0073284 A1* | 3/2016 | Qian | H04W 52/0229 370/241 |
| 2016/0242231 A1* | 8/2016 | Vajapeyam | H04W 24/08 |
| 2016/0352454 A1* | 12/2016 | Zhang | H04L 1/0003 |
| 2017/0013557 A1* | 1/2017 | Koc | H04J 3/1694 |
| 2017/0019820 A1* | 1/2017 | Das | H04W 36/0016 |
| 2017/0238340 A1* | 8/2017 | Park | H04W 74/002 370/329 |
| 2017/0302414 A1 | 10/2017 | Islam et al. | |
| 2018/0184460 A1* | 6/2018 | Hou | H04W 74/085 |
| 2018/0227958 A1* | 8/2018 | Xiong | H04W 88/023 |
| 2018/0270869 A1* | 9/2018 | Tsai | H04W 74/006 |

\* cited by examiner

METHOD AND DEVICE FOR CONFIGURING NETWORK PARAMETER AND COMPUTER-READABLE STORAGE MEDIUM

CROSS-REFERENCE TO RELATED APPLICATIONS

This application is a U.S. national stage of International Application No. PCT/CN2018/111740 filed on Oct. 24, 2018, the disclosure of which is hereby incorporated by reference in its entirety.

TECHNICAL FIELD

The disclosure relates to the field of communication technologies, and particularly to a method for configuring a network parameter, an apparatus for configuring a network parameter, and a computer-readable storage medium.

BACKGROUND

In a long-term evolution (LTE) network, a base station and a terminal device may need to employ the same network parameter configuration, to ensure normal data transmission between the base station and the terminal device.

The current process of configuring a network parameter may be usually as follows. The terminal device reports configuration information to the base station, and the base station determines the network parameter configuration for the terminal device based on the configuration information, and indicates it to the terminal device for configuring through a radio resource control (RRC) signaling. The configuration information is configured to indicate configuration requirements of the terminal device.

The process of configuring the network parameter is completed through a RRC layer in the above technical solution, which results in a slower entire process of configuring the network parameter.

SUMMARY

The disclosure provides a method for configuring a network parameter, an apparatus for configuring a network parameter, and a computer-readable storage medium, to speed up the process of configuring the network parameter.

According to a first aspect of embodiments of the disclosure, a method for configuring a network parameter is provided. The method may include: transmitting, by a terminal device, a configuration change request to a base station through a first physical layer resource, the first physical layer resource being a physical layer resource corresponding to a first network configuration parameter, and the first network configuration parameter being a target network configuration parameter requested by the terminal device; receiving a configuration change response from the base station, the configuration change response for indicating whether to employ the first network configuration parameter to adjust network parameter configuration; and determining whether to adjust the network parameter configuration based on the configuration change response.

In the embodiments of the disclosure, the terminal device may transmit the configuration change request to the base station through the first physical layer resource, the base station may determine whether to employ the first network configuration parameter corresponding to the first physical layer resource, and the network parameter configuration may be conducted based on the response of the base station. In this process, the terminal device and the base station may transmit data with each other through the physical layer resource without involving the radio resource control layer, which saves the time for data encapsulation and decapsulation. In this process, the terminal device does not report the configuration information, but directly reports the network configuration parameter, and the base station does not need to determine the network configuration parameter based on the configuration information. The base station may process faster and the load of the base station may be reduced. Therefore, the speed of configuring the network parameter may be accelerated.

In some embodiments of the disclosure, the first physical layer resource may include at least one of a physical layer time resource, a physical layer frequency resource, a physical layer spatial domain resource, and a physical layer code resource.

In the embodiments, the physical layer resource may be time, frequency, spatial domain and code resources.

In some embodiments of the disclosure, determining whether to adjust the network parameter configuration based on the configuration change response includes: determining to adjust the network parameter configuration based on the first network configuration parameter when the configuration change response includes an identifier of the first physical layer resource; or, determining to adjust the network parameter configuration based on a second network configuration parameter corresponding to a second physical layer resource when the configuration change response includes an identifier of the second physical layer resource; or, determining not to adjust the network parameter configuration when the configuration change response includes a back off indication.

In the embodiments, the disclosure records three situations. One is to perform the network configuration based on the network configuration parameter determined by the terminal device; another is to perform the network configuration based on the network configuration parameter re-determined by the base station; and still another is temporarily not to adjust the network parameter configuration. Therefore, network configuration requirements in various situations may be satisfied.

In some embodiments of the disclosure, the method may further include: retransmitting the configuration change request to the base station through the first physical layer resource after a duration indicated by the back off indication.

When the base station indicates temporarily not to adjust the network parameter configuration, the configuration change request may be retransmitted after a period of time, and the base station may be requested to adjust the network parameter configuration.

In some embodiments of the disclosure, the method may further include: receiving a correspondence between network configuration parameters and physical layer resources from the base station.

In the embodiments, the base station may transmit the corresponding between network configuration parameters and physical layer resources in advance to ensure that the terminal device can select an appropriate physical layer resource to transmit the configuration change request to the base station.

In some embodiments of the disclosure, receiving the correspondence between network configuration parameters and physical layer resources from the base station may include: receiving a radio resource control signaling, a media access control layer signaling or a broadcast packet from the base station, in which the radio resource control signaling, the media access control layer signaling or the broadcast packet may carry the correspondence between network configuration parameters and physical layer resources.

In the embodiments, the correspondence between network configuration parameters and physical layer resources may be transmitted through the radio resource control signaling, the media access control layer signaling or the broadcast packet, which is simple and convenient to implement.

In some embodiments of the disclosure, receiving the correspondence between network configuration parameters and physical layer resources from the base station may include: receiving a physical downlink control channel order from the base station, in which the physical downlink control channel order may carry the correspondence between network configuration parameters and physical layer resources.

In the embodiments, the correspondence between network configuration parameters and physical layer resources may be transmitted through the physical downlink control channel order, which may have a high transmission speed.

In some embodiments of the disclosure, the configuration change request may further include a user identifier of the terminal device when the first physical layer resource is a resource shared by at least two terminal devices.

In the embodiments, the base station may allocate the same physical layer resource to different terminal devices. At this time, the terminal device may need to carry the user identifier in the configuration change request for distinguishing.

In some embodiments of the disclosure, the method may further include: determining not to adjust the network parameter configuration when the configuration change response is not received for more than a preset duration.

In the embodiments, the network parameter configuration is not adjusted temporarily when the configuration change response from the base station is not received after the timeout.

According to a second aspect of embodiments of the disclosure, a method for configuring a network parameter is provided. The method may include: receiving, by a base station, a configuration change request from a terminal device through a first physical layer resource, the first physical layer resource being a physical layer resource corresponding to a first network configuration parameter, and the first network configuration parameter being a target network configuration parameter requested by the terminal device; and transmitting a configuration change response to the terminal device, the configuration change response for indicating whether to employ the first network configuration parameter to adjust network parameter configuration.

In some embodiments of the disclosure, the first physical layer resource may include at least one of a physical layer time resource, a physical layer frequency resource, a physical layer spatial domain resource, and a physical layer code resource.

In some embodiments of the disclosure, the configuration change response may include an identifier of the first physical layer resource when the configuration change response is configured to indicate to adjust the network parameter configuration based on the first network configuration parameter; or, the configuration change response may include an identifier of a second physical layer resource when the configuration change response is configured to indicate to adjust the network parameter configuration based on a second network configuration parameter corresponding to the second physical layer resource; or, the configuration change response may include a back off indication when the configuration change response is configured to indicate not to adjust the network parameter configuration.

In some embodiments of the disclosure, the method may further include: transmitting a correspondence between network configuration parameters and physical layer resources to the terminal device.

In some embodiments of the disclosure, transmitting the correspondence between network configuration parameters and physical layer resources to the terminal device may include: transmitting a radio resource control signaling, a media access control layer signaling or a broadcast packet to the terminal device, in which the radio resource control signaling, the media access control layer signaling or the broadcast packet may carry the correspondence between network configuration parameters and physical layer resources.

In some embodiments of the disclosure, transmitting the correspondence between network configuration parameters and physical layer resources to the terminal device may include: transmitting a physical downlink control channel order to the terminal device, in which the physical downlink control channel order may carry the correspondence between network configuration parameters and physical layer resources.

In some embodiments of the disclosure, when the correspondence between network configuration parameters and physical layer resources corresponds to a group of terminal devices, and the group of terminal devices includes at least two terminal devices, the method may further include: transmitting the configuration change response to other terminal device in the group of terminal devices.

According to a third aspect of embodiments of the disclosure, an apparatus for configuring a network parameter is provided. The apparatus may include: a transmission unit, configures to transmit a configuration change request to a base station through a first physical layer resource, the first physical layer resource being a physical layer resource corresponding to a first network configuration parameter, and the first network configuration parameter being a target network configuration parameter requested by the terminal device; a reception unit, configured to receive a configuration change response from the base station, the configuration change response for indicating whether to employ the first network configuration parameter to adjust network parameter configuration; and a determining unit, configured to determine whether to adjust the network parameter configuration based on the configuration change response.

In some embodiments of the disclosure, the first physical layer resource may include at least one of a physical layer time resource, a physical layer frequency resource, a physical layer spatial domain resource, and a physical layer code resource.

In some embodiments of the disclosure, the determining unit, is configured to: determine to adjust the network parameter configuration based on the first network configuration parameter when the configuration change response includes an identifier of the first physical layer resource; or, determine to adjust the network parameter configuration based on a second network configuration parameter corresponding to a second physical layer resource when the configuration change response includes an identifier of the second physical layer resource; or, determine not to adjust the network parameter configuration when the configuration change response includes a back off indication.

In some embodiments of the disclosure, the transmission unit is further configured to retransmit the configuration change request to the base station through the first physical layer resource after a duration indicated by the back off indication.

In some embodiments of the disclosure, the reception unit is further configured to receive a correspondence between network configuration parameters and physical layer resources from the base station.

In some embodiments of the disclosure, the reception unit is configured to receive a radio resource control signaling, a media access control layer signaling or a broadcast packet from the base station, in which the radio resource control signaling, the media access control layer signaling or the broadcast packet may carry the correspondence between network configuration parameters and physical layer resources.

In some embodiments of the disclosure, the reception unit is configured to receive a physical downlink control channel order from the base station, in which the physical downlink control channel order may carry the correspondence between network configuration parameters and physical layer resources.

In some embodiments of the disclosure, the configuration change request may further include a user identifier of the terminal device when the first physical layer resource is a resource shared by at least two terminal devices.

In some embodiments of the disclosure, the second determining unit is configured not to adjust the network parameter configuration when the configuration change response is not received for more than a preset duration.

According to a fourth aspect of embodiments of the disclosure, an apparatus for configuring a network parameter is provided. The apparatus may include: a reception unit, configured to receive a configuration change request from a terminal device through a first physical layer resource, the first physical layer resource being a physical layer resource corresponding to a first network configuration parameter, and the first network configuration parameter being a target network configuration parameter requested by the terminal device; and a transmission unit, configure to transmit a configuration change response to the terminal device, the configuration change response for indicating whether to employ the first network configuration parameter to adjust network parameter configuration.

In some embodiments of the disclosure, the first physical layer resource may include at least one of a physical layer time resource, a physical layer frequency resource, a physical layer spatial domain resource, and a physical layer code resource.

In some embodiments of the disclosure, the configuration change response may include an identifier of the first physical layer resource when the configuration change response is configured to indicate to adjust the network parameter configuration based on the first network configuration parameter; or, the configuration change response may include an identifier of a second physical layer resource when the configuration change response is configured to indicate to adjust the network parameter configuration based on a second network configuration parameter corresponding to the second physical layer resource; or, the configuration change response may include a back off indication when the configuration change response is configured to indicate not to adjust the network parameter configuration.

In some embodiments of the disclosure, the transmission unit is configured to transmit a correspondence between network configuration parameters and physical layer resources to the terminal device.

In some embodiments of the disclosure, the transmission unit is configured to transmit a radio resource control signaling, a media access control layer signaling or a broadcast packet to the terminal device, in which the radio resource control signaling, the media access control layer signaling or the broadcast packet may carry the correspondence between network configuration parameters and physical layer resources.

In some embodiments of the disclosure, the transmission unit is configured to transmit a physical downlink control channel order to the terminal device, in which the physical downlink control channel order may carry the correspondence between network configuration parameters and physical layer resources.

In some embodiments of the disclosure, when the correspondence between network configuration parameters and physical layer resources corresponds to a group of terminal devices, and the group of terminal devices includes at least two terminal devices, the transmission unit is configured to transmit the configuration change response to other terminal device in the group of terminal devices.

According to a fifth aspect of embodiments of the disclosure, a device for configuring a network parameter is provided. The device may include: a processor, and a memory configured to store instructions executable by the processor; in which, the processor is configured to: transmit a configuration change request to a base station through a first physical layer resource, the first physical layer resource being a physical layer resource corresponding to a first network configuration parameter, and the first network configuration parameter being a target network configuration parameter requested by the terminal device; receive a configuration change response from the base station, the configuration change response for indicating whether to employ the first network configuration parameter to adjust network parameter configuration; and determine whether to adjust the network parameter configuration based on the configuration change response.

According to a sixth aspect of embodiments of the disclosure, a device for configuring a network parameter is provided. The device may include: a processor, and a memory configured to store instructions executable by the processor; in which, the processor is configured to: receive a configuration change request from a terminal device through a first physical layer resource, the first physical layer resource being a physical layer resource corresponding to a first network configuration parameter, and the first network configuration parameter being a target network configuration parameter requested by the terminal device; and transmit a configuration change response to the terminal device, the configuration change response for indicating whether to employ the first network configuration parameter to adjust network parameter configuration.

According to a seventh aspect of embodiments of the disclosure, a computer-readable storage medium is provided, in which when instructions in the computer-readable storage medium are executed by a processor of an apparatus for configuring a network parameter, the apparatus for configuring the network parameter is caused to execute the method for configuring a network parameter as described in the first aspect.

According to an eighth aspect of embodiments of the disclosure, a computer-readable storage medium is provided, in which when instructions in the computer-readable storage medium are executed by a processor of an apparatus for configuring a network parameter, the apparatus for configuring the network parameter is caused to execute the method for configuring a network parameter as described in the second aspect.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
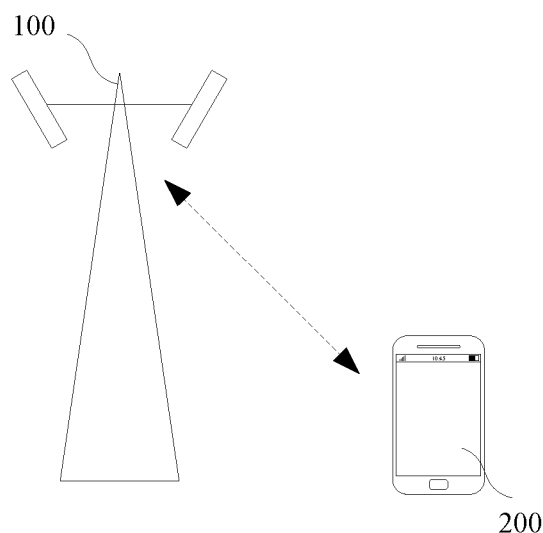
FIG. 1 is a schematic diagram of a network architecture according to embodiments of the disclosure.

FIG. 1 is a schematic diagram of a network architecture according to embodiments of the disclosure. Referring to FIG. 1, the base station 100 and the terminal device 200 may employ the same network parameter configuration for data transmission. For example, the base station 100 and the terminal device 200 may be configured with the same discontinuous reception (DRX) period. Therefore, the power saving requirement of the terminal device may be realized. The terminal device may include, but may be not limited to, smart phones, tablet computers, etc. The base station may be an evolved nodeB (eNB).

Figure 2:
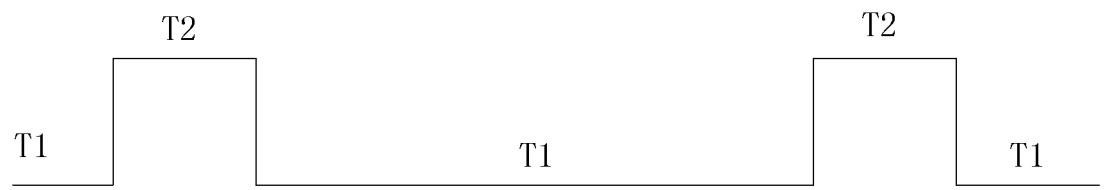
FIG. 2 is a schematic diagram of a DRX (Discontinuous Reception) solution.

FIG. 2 is a schematic diagram of a DRX solution. Referring to FIG. 2, the terminal device periodically enters a dormant state. The terminal device does not need to monitor a physical downlink control channel (PDCCH) during the dormant duration T1. At the end of one dormant duration, the terminal device may monitor the PDCCH within a duration T2 to determine whether it needs to enter an activated state from the dormant state. A DRX period includes a dormant duration T1 and a monitoring duration T2. In order to ensure the normal transmission of data between the terminal device and the base station, the same DRX period needs to be employed by the terminal device and the base station. The DRX period is usually configured by the base station based on the configuration information—power preference indication (PPI) of the terminal device.

The configuration process of the DRX period is as follows. The terminal device reports the PPI to the base station, the base station determines the DRX period for the terminal device based on the PPI, and indicates it to the terminal device through the RRC signaling for configuring it. In the above configuration way, the process of configuring the network parameter may be completed through the RRC layer, which results in a slower entire process of configuring the network parameter.

To this end, the embodiments of the disclosure provide a method for configuring a network parameter, an apparatus for configuring a network parameter, and a computer-readable storage medium to shorten the duration needed in the network parameter configuration.

Figure 3:
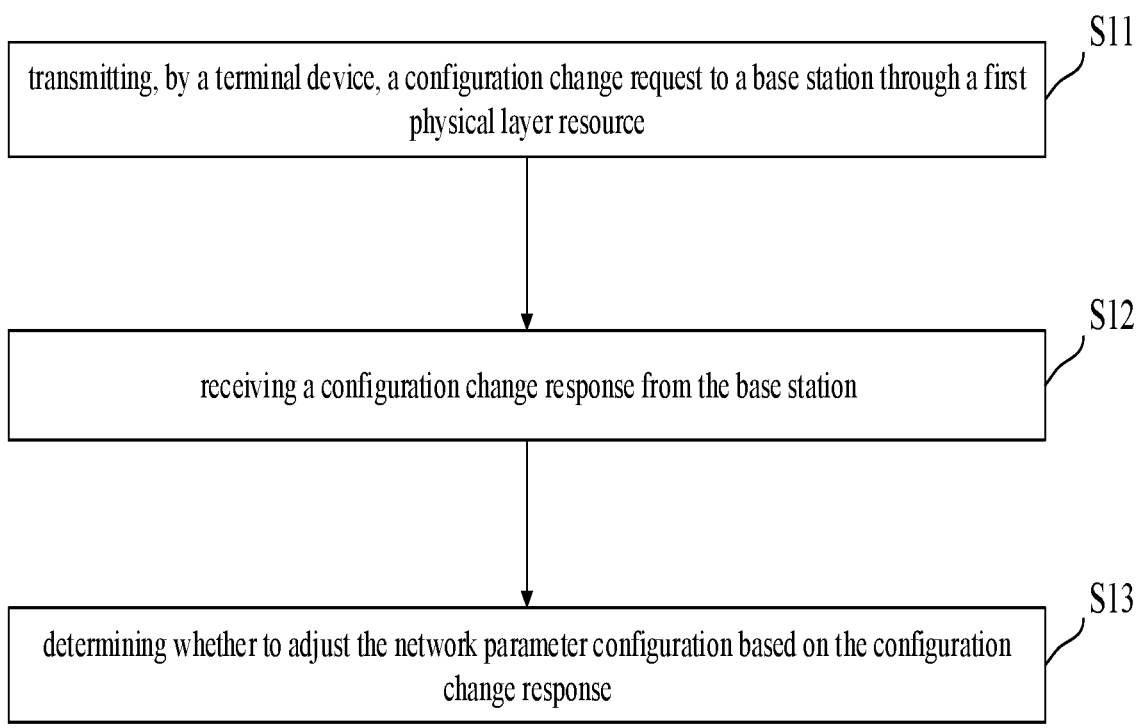
FIG. 3 is a flow chart illustrating a method for configuring a network parameter according to an exemplary embodiment.

FIG. 3 is a flow chart illustrating a method for configuring a network parameter according to an exemplary embodiment. This method may be executable by a terminal device. Referring to FIG. 3, the method for configuring the network parameter may include the following.

In block S11, the terminal device transmits a configuration change request to a base station through a first physical layer resource.

The first physical layer resource is a physical layer resource corresponding to a first network configuration parameter, and the first network configuration parameter is a target network configuration parameter requested by the terminal device.

Optionally, the method may further include: acquiring configuration information of the terminal device; and determining the first network configuration parameter corresponding to the configuration information of the terminal device based on a correspondence between configuration information and network configuration parameters.

In the embodiments, the terminal device determines the network configuration parameter corresponding to the configuration information of the terminal device based on the pre-configured correspondence between configuration information and network configuration parameters, and further transmits the configuration change request. The embodiments may be simple and practicable, and convenient to be implemented.

In the embodiments of the disclosure, the configuration information may be configuration information set by the user for the terminal device, such as PPI. When the user sets the terminal device to the power saving mode, the PPI is power saving. When the user sets the terminal device to the power non-saving mode, the PPI is power not-saving. In the embodiments, the configuration information includes a power preference indication, and the discontinuous reception period in the network configuration may be adjusted by changing the power preference indication. The configuration information may also be other configuration information of the terminal device, which is not limited in the disclosure.

In the terminal device, the correspondence between various configuration information and network configuration parameters is stored. The correspondence may be issued by the base station to the terminal device, or written into the network protocol in advance.

In this block, the terminal device determines the first network configuration parameter corresponding to the configuration information of the terminal device based on the correspondence between configuration information and network configuration parameters.

For example, the configuration information is the PPI, and the correspondence between PPIs and DRX periods is stored in the terminal device. The terminal device determines the DRX period corresponding to the acquired configuration information based on the correspondence.

As an example, in this block, the terminal device may first determine the first physical layer resource corresponding to the first network configuration parameter through the correspondence between network configuration parameters and physical layer resources; and then transmit the configuration change request to the base station through the first physical layer resource.

The correspondence between network configuration parameters and physical layer resources is transmitted to the terminal device by the base station.

In block S12, a configuration change response is received from the base station.

The configuration change response is configured to indicate whether to employ the first network configuration parameter to adjust network parameter configuration.

For example, the configuration change response is configured to indicate whether the terminal device may adjust the network parameter configuration. When the network parameter configuration may be adjusted, the configuration change response is also configured to indicate the network configuration parameter that is employed, such as the first network configuration parameter or the second network configuration parameter.

In block S13, it is determined whether to adjust the network parameter configuration based on the configuration change response.

The terminal device may analyze the configuration change response and determine whether to adjust the network parameter configuration based on an indication of the configuration change response.

For example, when the configuration change response indicates the first network configuration parameter or the second network configuration parameter, it is determined to adjust the network parameter configuration.

When it is determined to adjust the network parameter configuration, the network configuration parameter indicated by the configuration change response is employed to adjust the network parameter configuration.

In the embodiments of the disclosure, the terminal device may transmit the configuration change request to the base station through the first physical layer resource, the base station may determine whether to employ the first network configuration parameter corresponding to the first physical layer resource, and the network parameter configuration may be conducted based on the response of the base station. In this process, the terminal device and the base station may transmit data with each other through the physical layer resources without involving the radio resource control layer, which saves the time for data encapsulation and decapsulation. In this process, the terminal device does not report configuration information, but directly reports the network configuration parameter, and the base station does not need to determine the network configuration parameter based on the configuration information. The base station may process faster and the load of the base station may be reduced. Therefore, the speed of configuring the network parameter may be accelerated.

Optionally, the first physical layer resource may include at least one of a physical layer time resource, a physical layer frequency resource, a physical layer spatial domain resource, and a physical layer code resource.

In the embodiments, the physical layer resource may be time, frequency, spatial domain, and code resources. For example, the time domain resource may allocate a certain period of time of a frequency domain resource to the terminal device, the frequency domain resource may allocate a specific frequency band resource to the terminal device, and the code resource may be the preamble in the random access process, and the like.

Taking the code resource as the preamble in the random access process as an example, the terminal device may employ the random access request as the configuration change request to request to switch the network parameter configuration. Correspondingly, the base station may employ the random access response (RAR) as the configuration change response to indicate the terminal device whether it can be switched.

Here, the physical layer resources in the correspondence between network configuration parameters and physical layer resources may be reserved for the negotiation of network configuration parameters between the base station and the terminal device.

Optionally, determining whether to adjust the network parameter configuration based on the configuration change response may include: determining to adjust the network parameter configuration based on the first network configuration parameter when the configuration change response includes an identifier of the first physical layer resource; or, determining to adjust the network parameter configuration based on a second network configuration parameter corresponding to a second physical layer resource when the configuration change response includes an identifier of the second physical layer resource; or, determining not to adjust the network parameter configuration when the configuration change response includes a back off indication (BI).

In the embodiments, the disclosure records three situations. One is to perform the network configuration based on the network configuration parameter determined by the terminal device; another is to perform the network configuration based on the network configuration parameter re-determined by the base station; and still another is temporarily not to adjust the network parameter configuration. Therefore, network configuration requirements in various situations may be satisfied.

For example, when the base station determines based on the algorithm that the first network configuration parameter may be employed to adjust the network parameter configuration, the identifier of the first physical layer resource is carried in the configuration change response and is transmitted to the terminal device. When the base station determines based on the algorithm that the first network configuration parameter may not be employed to adjust the network parameter configuration, the base station determines the second network configuration parameter that may be employed to adjust the network parameter configuration, and the identifier of the second physical layer resource corresponding to the second network configuration parameter may be carried in the configuration change response and be transmitted to the terminal device. When the load of the base station is high and there are no resources to make the above determination, the back off indication is carried in the configuration change response and is transmitted to the terminal device.

In some embodiments, when the configuration change response includes the identifier of the second physical layer resource, the terminal device may further determine whether the second network configuration parameter satisfies the configuration information requirements of the terminal device. When the second network configuration parameter satisfies the configuration information requirements of the terminal device, it is determined to adjust the network parameter configuration based on the second network configuration parameter corresponding to the second physical layer resource.

Optionally, the method may further include: retransmitting the configuration change request to the base station through the first physical layer resource after a duration indicated by the back off indication. When the base station indicates temporarily not to adjust the network parameter configuration, the configuration change request may be retransmitted a period of time later, and the base station may be requested to adjust the network parameter configuration again.

The length of the delay herein is indicated by the back off indication in the configuration change response.

In other embodiments, the terminal device may also no longer generate the configuration change request after the duration indicated by the back off indication.

Optionally, the method may further include: receiving a correspondence between network configuration parameters and physical layer resources from the base station.

In the embodiments, the base station may transmit the corresponding between network configuration parameters and physical layer resources in advance to ensure that the terminal device can select an appropriate physical layer resource to transmit the configuration change request to the base station.

In other embodiments, the corresponding between network configuration parameters and physical layer resources may also be written into the network protocol in advance.

In some embodiments, the base station may periodically transmit the corresponding between network configuration parameters and physical layer resources to the terminal device.

The corresponding between network configuration parameters and physical layer resources may be the correspondence between identifiers of network configuration parameters and identifiers of physical layer resources.

Optionally, receiving the correspondence between network configuration parameters and physical layer resources from the base station may include: receiving a radio resource control signaling, a media access control layer signaling or a broadcast packet from the base station, in which the radio resource control signaling, the media access control layer signaling or the broadcast packet may carry the correspondence between network configuration parameters and physical layer resources.

In the embodiments, the correspondence between network configuration parameters and physical layer resources may be transmitted to the base station through the radio resource control signaling, the media access control layer signaling or the broadcast packet, so that the terminal device may determine the physical layer resource corresponding to the network configuration parameter based on the correspondence between network configuration parameters and physical layer resources, which is simple and convenient to be implemented.

The media access control layer signaling may be a protocol data unit (PDU) of media access control (MAC) layer, and the correspondence between network configuration parameters and physical layer resources may be carried in the field of the control element (CE) in the PDU.

Optionally, receiving the correspondence between network configuration parameters and physical layer resources from the base station may include: receiving a physical downlink control channel order from the base station, and the physical downlink control channel order may carry the correspondence between network configuration parameters and physical layer resources.

In the embodiments, the correspondence between network configuration parameters and physical layer resources may be transmitted through the physical downlink control channel order, which may have a high transmission speed.

Optionally, the configuration change request may further include a user identifier of a terminal device when the first physical layer resource is a resource shared by at least two terminal devices.

In the embodiments, the base station may allocate the same physical layer resource to different terminal devices. At this time, the terminal device may need to carry the user identifier in the configuration change request for distinguishing.

The user identifier herein may be a physical identifier of the terminal device, such as International Mobile Station Equipment Identity.

Optionally, the method may further include: determining not to adjust the network parameter configuration when the configuration change response is not received for more than a preset duration.

In the embodiment, the network parameter configuration is not adjusted temporarily when the configuration change response from the base station is not received after the timeout.

It is worth noting that the actions in the above blocks S11-S13 and the above optional actions may be combined arbitrarily.

Figure 4:
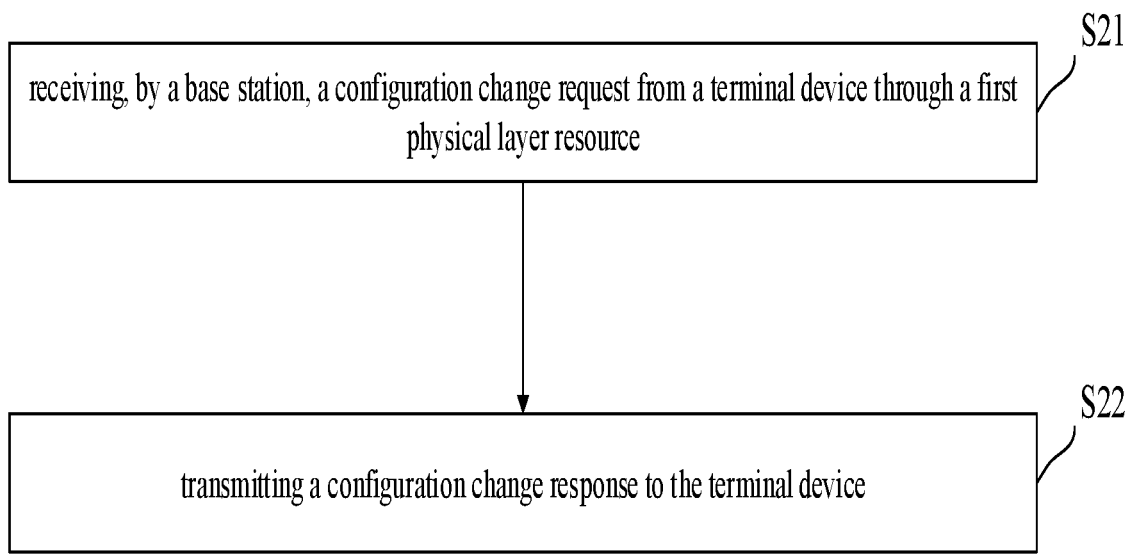
FIG. 4 is a flow chart illustrating a method for configuring a network parameter according to an exemplary embodiment.

FIG. 4 is a flow chart illustrating a method for configuring a network parameter according to an exemplary embodiment. This method may be executable by a base station. Referring to FIG. 4, the method for configuring the network parameter may include the following.

In block S21, the base station receives a configuration change request from the terminal device through a first physical layer resource.

The first physical layer resource is a physical layer resource corresponding to a first network configuration parameter, and the first network configuration parameter is a target network configuration parameter requested by the terminal device.

In the embodiments, the terminal device may determine the physical layer resource corresponding to the first network configuration parameter through a correspondence between network configuration parameters and physical layer resources. The correspondence between network configuration parameters and physical layer resources may be transmitted to the terminal device by the base station.

In block S22, a configuration change response is transmitted to the terminal device.

The configuration change response is configured to indicate whether to employ the first network configuration parameter to adjust the network parameter configuration.

In the block, the base station determines whether the first network configuration parameter may be employed to adjust the network parameter configuration based on a preset algorithm. For example, when the network configuration parameter is a DRX period, the base station may consider whether the DRX period can guarantee the mobile robustness requirements of the terminal device based on the location of the terminal device. For example, when the terminal device is at the edge of the cell, the DRX period should be set smaller, or the DRX should not be enabled; and when the terminal device is at the center of the cell, the DRX period should be set longer.

The configuration change response is configured to indicate whether the terminal device may adjust the network parameter configuration, and when the network parameter configuration may be adjusted, the configuration change response is also configured to indicate the network configuration parameter that is employed, such as the first network configuration parameter or the second network configuration parameter.

When it is determined to adjust the network parameter configuration, the network configuration parameter indicated by the configuration change response is configured to adjust the network parameter configuration.

In the embodiments of the disclosure, the terminal device may transmit the configuration change request to the base station through the first physical layer resource, the base station may determine whether to employ the first network configuration parameter corresponding to the first physical layer resource, and the network parameter configuration may be conducted based on the response of the base station. In this process, the terminal device and the base station may transmit data with each other through the physical layer resource without involving the radio resource control layer, which saves the time for data encapsulation and decapsulation. In this process, the terminal device does not report the configuration information, but directly reports the network configuration parameter, and the base station does not need to determine the network configuration parameter based on the configuration information. The base station may process faster and the load of the base station may be reduced. Therefore, the speed of configuring the network parameter may be accelerated.

Optionally, the first physical layer resource may include at least one of a physical layer time resource, a physical layer frequency resource, a physical layer spatial domain resource, and a physical layer code resource. For example, the time domain resource may allocate a certain period of time of a frequency domain resource to the terminal device, the frequency domain resource may allocate a specific frequency band resource to the terminal device, and the code resource may be the preamble in the random access process, and the like.

Optionally, the configuration change response may include an identifier of the first physical layer resource when the configuration change response is configured to indicate to adjust the network parameter configuration based on the first network configuration parameter; or, the configuration change response may include an identifier of a second physical layer resource when the configuration change response is configured to indicate to adjust the network parameter configuration based on a second network configuration parameter corresponding to the second physical layer resource; or, the configuration change response may include a back off indication when the configuration change response is configured to indicate not to adjust the network parameter configuration.

Optionally, the method may further include: transmitting a correspondence between network configuration parameters and physical layer resources to the terminal device.

Optionally, transmitting the correspondence between network configuration parameters and physical layer resources to the terminal device may include: transmitting a radio resource control signaling, a media access control layer signaling or a broadcast packet to the terminal device, in which the radio resource control signaling, the media access control layer signaling or the broadcast packet may carry the correspondence between network configuration parameters and physical layer resources.

In the embodiments, the correspondence between network configuration parameters and physical layer resources may be transmitted to the base station through the radio resource control signaling, the media access control layer signaling or the broadcast packet, so that the terminal device may determine the physical layer resource corresponding to the network configuration parameter based on the correspondence between network configuration parameters and physical layer resources, which is simple and convenient to be implemented.

The media access control layer signaling may be a protocol data unit (PDU) of media access control (MAC) layer, and the correspondence between network configuration parameters and physical layer resources may be carried in the field of the control element (CE) in the PDU.

Optionally, transmitting the correspondence between network configuration parameters and physical layer resources to the terminal device may include: transmitting a physical downlink control channel order to the terminal device, in which the physical downlink control channel order may carry the correspondence between network configuration parameters and physical layer resources.

Optionally, when the correspondence between network configuration parameters and physical layer resources corresponds to a group of terminal devices, and the group of terminal devices includes at least two terminal devices, the method may further include: transmitting the configuration change response to other terminal device in the group of terminal devices.

It is worth noting that the actions in the above blocks S21-S22 and the above optional blocks may be combined arbitrarily.

Figure 5:
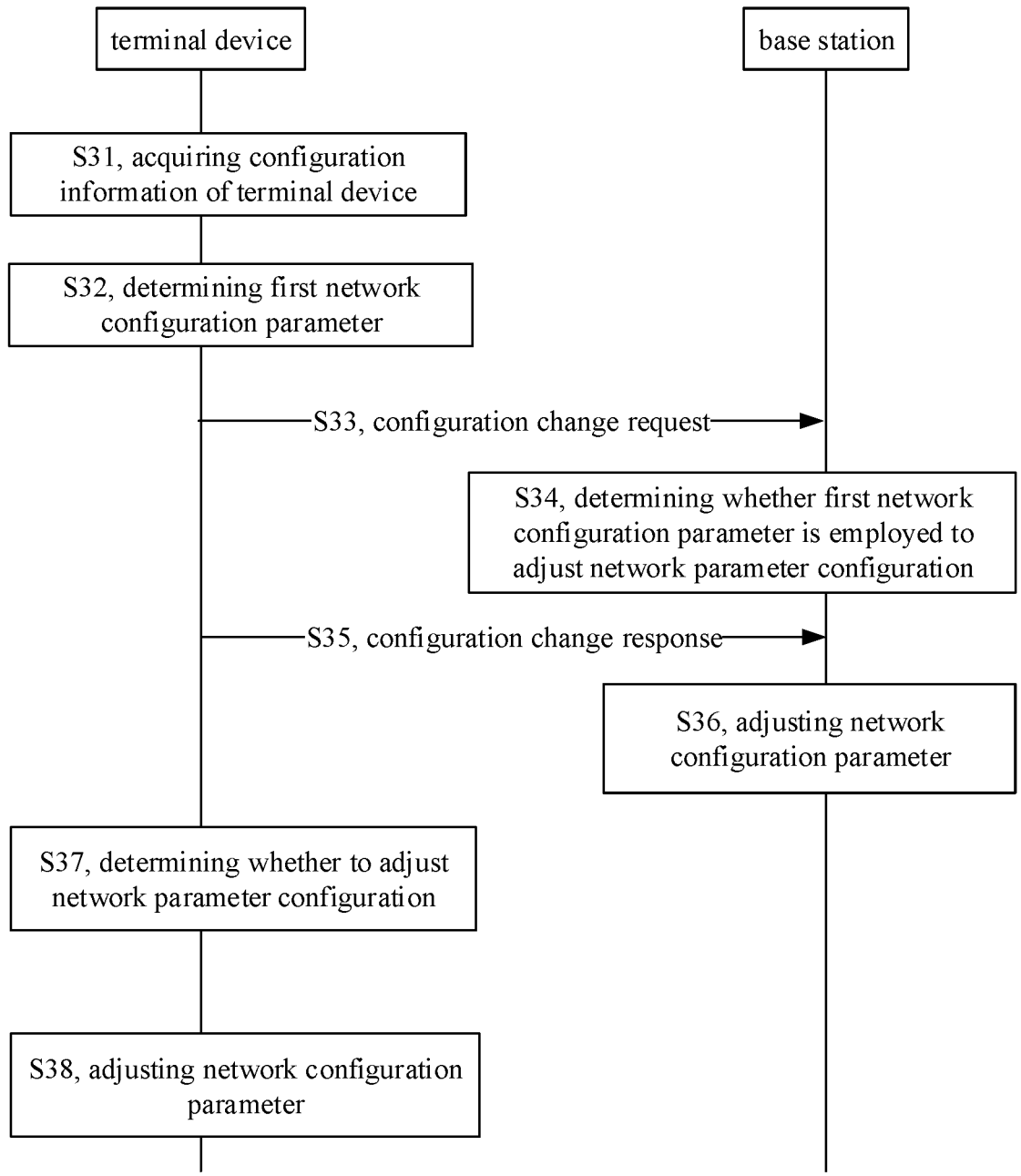
FIG. 5 is a flow chart illustrating a method for configuring a network parameter according to an exemplary embodiment.

FIG. 5 is a flow chart illustrating a method for configuring a network parameter according to an exemplary embodiment. This method may jointly executable by the above terminal device and base station. Referring to FIG. 5, the method for configuring the network parameter may include the following.

In block S31, the terminal device acquires configuration information of the terminal device.

In the embodiments of the disclosure, the configuration information may be configuration information set by the user for the terminal device, such as PPI. When the user sets the terminal device to the power saving mode, the PPI is power saving. When the user sets the terminal device to power non-saving mode, the PPI is power not-saving. In the embodiments, the configuration information includes a power preference indication, and the discontinuous reception period in the network configuration may be adjusted by changing the power preference indication. The configuration information may also be other configuration information of the terminal device, such as network quality information. For example, when the terminal device detects a wireless link failure, the network quality information is weak. At this time, the terminal device may respond by reducing the DRX period.

The method may further include: the terminal device receiving a terminal device setting instruction inputted by the user; and generating and saving the configuration information based on the terminal device setting instruction. For example, when a power saving mode instruction of the terminal device is received, the PPI is generated as power saving configuration information.

In block S32, the terminal device determines the first network configuration parameter based on the configuration information of the terminal device.

The first network configuration parameter is a network configuration parameter that the terminal device wants to employ.

In the terminal device, the correspondence between various configuration information and network configuration parameters is stored. The correspondence may be issued by the base station to the terminal device, or written into the network protocol in advance.

In this block, the terminal device determines the network configuration parameter corresponding to the configuration information of the terminal device based on the correspondence between configuration information and network configuration parameters.

For example, the configuration information is the PPI, and the correspondence between PPIs and DRX periods is stored in the terminal device. The terminal device determines the DRX period corresponding to the configuration information acquired in block S31 based on the correspondence.

In block S33, the terminal device transmits a configuration change request to a base station through a first physical layer resource, in which the first physical layer resource is a physical layer resource corresponding to a first network configuration parameter, and the first network configuration parameter is a target network configuration parameter requested by the terminal device.

As an example, in this block, the terminal device may first determine the first physical layer resource corresponding to the first network configuration parameter through the correspondence between network configuration parameters and physical layer resources; and then transmit the configuration change request to the base station through the first physical layer resource.

Optionally, the first physical layer resource may include at least one of a physical layer time resource, a physical layer frequency resource, a physical layer spatial domain resource, and a physical layer code resource. For example, the time domain resource may allocate a certain period of time of a frequency domain resource to the terminal device, the frequency domain resource may allocate a specific frequency band resource to the terminal device, and the code resource may be the preamble in the random-access process.

In some embodiments, the correspondence between network configuration parameters and physical layer resources may include a set of physical layer resources, and the set of physical layer resources may include at least one type of physical layer resources. Each network configuration parameter corresponds to one physical layer resource of the type of physical layer resources in the set of physical layer resources. The terminal device may select the physical layer resource from the set of physical layer resources based on the network configuration parameter to be switched. A group of terminal devices may correspond to the same physical layer resource, and different groups of terminal devices correspond to different physical layer resources.

In some embodiments, the correspondence between network configuration parameters and physical layer resources may include multiple sets of physical layer resources, and each set may include at least one physical layer resource. Each network configuration parameter corresponds to one set of physical layer resources. The terminal device may select at least one physical layer resource from a corresponding set of physical layer resources based on the network configuration parameter to be switched, for example, orderly select a physical layer resource from the set of physical layer resources, or randomly select a physical layer resource from the set of physical layer resources. A group of terminal devices corresponds to the same set of physical layer resources, and different groups of terminal devices correspond to different sets of physical layer resources.

The correspondence between network configuration parameters and physical layer resources may be transmitted to the terminal device by the base station. That is, the method may further include: the base station transmitting the correspondence between network configuration parameters and physical layer resources to the terminal device; and the terminal device receiving the correspondence between network configuration parameters and physical layer resources from the base station. In the embodiments, the base station transmits the correspondence between configuration parameters and physical layer resources in advance to ensure that the terminal device may select an appropriate physical layer resource to transmit the configuration change request to the base station.

Optionally, the correspondence between network configuration parameters and physical layer resources may also be set in the network protocol, so that the base station does not need to transmit it to the terminal device.

In some embodiments of the disclosure, the base station transmits a radio resource control signaling, a media access control layer signaling or a broadcast packet to a terminal device, in which the radio resource control signaling, the media access control layer signaling or the broadcast packet may carry the correspondence between network configuration parameters and physical layer resources; accordingly, the terminal device receives the radio resource control signaling, the media access control layer signaling or the broadcast packet from the base station.

In the embodiments, the correspondence between network configuration parameters and physical layer resources may be transmitted to the base station through the radio resource control signaling, the media access control layer signaling or the broadcast packet, so that the terminal device may determine the physical layer resource corresponding to the network configuration parameter based on the correspondence between network configuration parameters and physical layer resources, which is simple and convenient to be implemented.

The media access control layer signaling may be a protocol data unit (PDU) of media access control (MAC) layer, and the correspondence between network configuration parameters and physical layer resources may be carried in the field of the control element (CE) in the PDU.

In the embodiments, the base station may allocate the same correspondence between network configuration parameters and physical layer resources to at least two terminal devices at the same time. The configuration switch (or change) request may further include a user identifier of the terminal device when the first physical layer resource is the resource shared by at least two terminal devices. Here, the shared resource is a physical layer resource that may be used by at least two terminal devices. In the embodiments, the base station may allocate the same physical layer resource to different terminal devices. At this time, the terminal device needs to carry the user identifier in the configuration switch request for distinguishing.

The user identifier herein may be a physical identifier of the terminal device, such as International Mobile Station Equipment Identity.

Further, when the same correspondence between network configuration parameters and physical layer resources is allocated to at least two terminal devices at the same time, the base station may also add an identifier to the correspondence, so as to indicate the terminal device that the correspondence is allocated to at least two terminal devices. When the terminal device detects the identifier, it will carry the user identifier in the configuration change request.

In other embodiments of the disclosure, the base station transmits a physical downlink control channel order to the terminal device, in which the physical downlink control channel order carries the correspondence between network configuration parameters and physical layer resources; the terminal device receives the physical downlink control channel order transmitted by the base station order.

In the embodiments, the base station may allocate the dedicated correspondence between network configuration parameters and physical layer resources to the terminal device through the physical downlink control channel order, that is, the physical layer resource in the correspondence is only allocated to one terminal device. There is no need to carry the user identifier in the configuration change request.

In the block S34, the base station determines whether the first network configuration parameter is employed to adjust the network parameter configuration.

The base station determines whether the first network configuration parameter may be employed to adjust the network parameter configuration based on a preset algorithm. For example, when the network configuration parameter is a DRX period, the base station may consider whether the DRX period can guarantee the mobile robustness requirements of the terminal device based on the location of the terminal device. For example, when the terminal device is at the edge of the cell, the DRX period should be set smaller, or the DRX should not be enabled.

The configuration change response may include an identifier of the first physical layer resource when the configuration change response is configured to indicate to adjust the network parameter configuration based on the first network configuration parameter; or, the configuration change response may include an identifier of a second physical layer resource when the configuration change response is configured to indicate to adjust the network parameter configuration based on a second network configuration parameter corresponding to the second physical layer resource; or, the configuration change response may include a back off indication when the configuration change response is configured to indicate not to adjust the network parameter configuration.

In the embodiments, the disclosure records three situations. One is to perform the network configuration based on the network configuration parameter determined by the terminal device; another is to perform the network configuration based on the network configuration parameter redetermined by the base station; and still another is temporarily not to adjust the network parameter configuration. Therefore, network configuration requirements in various situations may be satisfied.

For example, when the base station determines based on the algorithm that the first network configuration parameter may be employed to adjust the network parameter configuration, the identifier of the first physical layer resource is carried in the configuration change response and is transmitted to the terminal device. When the base station determines based on the algorithm that the first network configuration parameter may not be employed to adjust the network parameter configuration, the base station determines the second network configuration parameter that may be employed to adjust the network parameter configuration, and the identifier of the second physical layer resource corresponding to the second network configuration parameter may be carried in the configuration change response and be transmitted to the terminal device. When the load of the base station is high and there are no resources to make the above determination, the back off indication is carried in the configuration change response and is transmitted to the terminal device.

The back off indication may be configured to indicate the terminal device to retransmit the configuration change request after a preset period of time. The preset period of time herein may be determined by the base station.

In block S35, the base station transmits a configuration change response to the terminal device.

The configuration change response is configured to indicate whether to employ the first network configuration parameter to adjust the network parameter configuration.

The configuration change response is configured to indicate whether the terminal device may adjust the network parameter configuration. When the network parameter configuration may be adjusted, the configuration change response is also configured to indicate the network configuration parameter that is employed, such as the first network configuration parameter or the second network configuration parameter.

Optionally, when the correspondence between network configuration parameters and physical layer resources corresponds to a group of terminal devices, and the group of terminal devices includes at least two terminal devices, the method may further include: transmitting the configuration change response to other terminal device in the group of terminal devices.

Further, transmitting the configuration change response to other terminal device in the group of terminal devices may include: transmitting the configuration change response to other terminal device in the group of terminal devices when the number of terminal devices in the group of terminal devices that request to switch to the first network configuration parameter exceeds a set value within a set period of time, that is, the base station may transmit the network configuration parameter to all terminal devices in the group when the number of terminal devices in the group of terminal devices that request to switch to the first network configuration parameter exceeds the set value within the set period of time, so as to realize the same network parameter configuration of the terminal devices in the group.

The set value may be a specific number or a proportion occupied in the total number of terminal devices in the group.

Further, when the base station determines one network configuration parameter based on the above method (whether the number exceeds the set value), the base station determines whether to adjust the network parameter configuration by the network configuration parameter based on the action in block S34 at this time, and transmits the corresponding configuration change response.

When the base station determines two or more network configuration parameters based on the above method, the base station determines whether each network configuration parameter may be employed to adjust the network parameter configuration at this time based on the action in block S34. When it is determined that there are two or more network configuration parameters that can be employed to adjust the network parameter configuration, one may be selected orderly or randomly and the identifier of the corresponding physical layer resource is carried in the configuration change response and transmitted to the terminal device.

For example, a group of terminal devices includes A, B, and C, in which A, B, and C all transmit configuration change requests to the base station, and both A and B request to switch to the first network configuration parameter, and C requests to switch to the third network configuration parameter. At this time, the base station determines that the number of terminal devices in the group of terminal devices that request to switch to the first network configuration parameter exceeds the set value (for example, 50% of the total number of terminal devices), and the base station determines that the first network configuration parameter may be employed to adjust the network parameter configuration based on the action in block S34. At this time, the configuration change response is transmitted to the terminal devices A, B, and C to indicate the terminal devices to switch to the first network configuration parameter. For another example, as long as terminal device A in the group of terminal devices transmits the configuration change request to request switching to the first network configuration parameter, the base station determines that the number of terminal devices in the group of terminal devices that request to switch to the first network configuration parameter exceeds the set value (0), and then the base station transmits configuration change responses to all terminal devices in the group.

In the embodiments of the disclosure, the base station may group terminal devices, and the terminal devices of the same group may employ the same network configuration parameter. The group of terminal devices includes at least two terminal devices. When the number of terminal devices in the group of terminal devices that request to switch to the first network configuration parameter exceeds the set value within the set period of time, the configuration change response is transmitted to all terminal devices in the group of terminal devices.

In block S36, when it is determined to adjust the network parameter configuration, the base station employs the network configuration parameter indicated by the configuration change response to adjust the network parameter configuration.

In the block, the base station employs the above first network configuration parameter or the above second network configuration parameter to adjust the network parameter configuration.

When it is determined not to adjust the network parameter configuration, the base station continues to employ the currently employed network configuration parameter to communicate with the terminal device.

There is no sequence relationship between the action in block S36 and the action in block S35.

In block S37, the terminal device determines whether to adjust the network parameter configuration based on the configuration change response.

In the block, it is determined whether to adjust the network parameter configuration based on the configuration change response, which may include the following.

It is determined to adjust the network parameter configuration based on the first network configuration parameter when the configuration change response includes the identifier of the first physical layer resource.

It is determined to adjust the network parameter configuration based on the second network configuration parameter corresponding to the second physical layer resource when the configuration change response includes the identifier of the second physical layer resource.

It is determined not to adjust the network parameter configuration when the configuration change response includes the back off indication.

In the embodiments, the disclosure records three situations. One is to perform the network configuration based on the network configuration parameter determined by the terminal device; another is to perform the network configuration based on the network configuration parameter re-determined by the base station; and still another is temporarily not to adjust the network parameter configuration. Therefore, network configuration requirements in various situations may be satisfied.

For example, the first situation indicates that the base station may employ the first network configuration parameter to adjust the network parameter configuration based on the determination of the algorithm. The second situation means that the base station determines that the first network configuration parameter may not be employed to adjust the network parameter configuration based on the determination of the algorithm, and determines the second network configuration parameter that may be employed to adjust the network parameter configuration. The third situation means that the base station has a high load and there is no resource to make the above determination.

When the configuration change response includes the back off indication, the method may further include the following.

The configuration change request may be retransmitted to the base station through the first physical layer resource after the duration indicated by the back off indication. When the base station indicates temporarily not to adjust the network parameter configuration, the configuration change request may be transmitted a period of time later, and the base station may be requested to adjust the network parameter configuration again.

The length of the delay herein is indicated by the back off indication in the configuration change response.

Of course, in other embodiments, the terminal device may also no longer generate the configuration change request after the duration indicated by the back off indication.

In the embodiments of the disclosure, when the configuration change response is not transmitted to the terminal device, the method further includes: determining not to adjust the network parameter configuration when the configuration change response is not received for more than the preset period of time. In the embodiments, the network parameter configuration is not adjusted temporarily when the configuration change response from the base station is not received after the timeout. After the period of time, the terminal device transmits the configuration change request to the base station again.

In block S38, when it is determined to adjust the network parameter configuration, the terminal device employs the network configuration parameter indicated by the configuration change response to adjust the network parameter configuration.

In the block, the terminal device employs the above first network configuration parameter or the above second network configuration parameter to adjust the network parameter configuration.

When it is determined not to adjust the network parameter configuration, the terminal device continues to employ the currently employed network configuration parameter to communicate with the base station.

Figure 6:
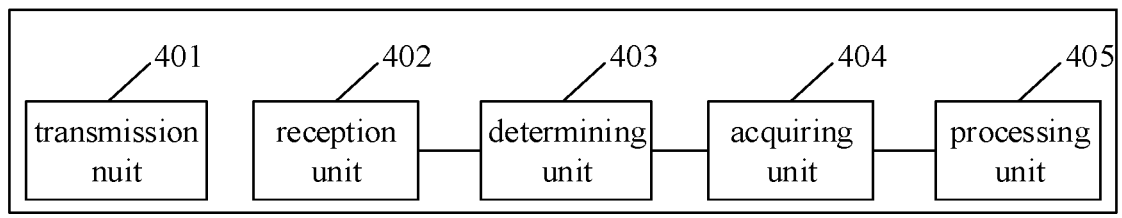
FIG. 6 is a block diagram illustrating an apparatus for configuring a network parameter according to an exemplary embodiment.

FIG. 6 is a block diagram illustrating an apparatus for configuring a network parameter according to an exemplary embodiment. Referring to FIG. 6, the apparatus may include a transmission unit 401, a reception unit 402, and a determining unit 403.

The transmission unit 401 is configured to transmit a configuration change request to a base station through a first physical layer resource, in which the first physical layer resource is a physical layer resource corresponding to a first network configuration parameter, and the first network configuration parameter is a target network configuration parameter requested by the terminal device. The reception unit 402 is configured to receive a configuration change response from the base station, in which the configuration change response is configured for indicating whether to employ the first network configuration parameter to adjust network parameter configuration. The determining unit 403 is configured to determine whether to adjust the network parameter configuration based on the configuration change response.

In some embodiments of the disclosure, the first physical layer resource may include at least one of a physical layer time resource, a physical layer frequency resource, a physical layer spatial domain resource, and a physical layer code resource.

In some embodiments of the disclosure, the determining unit 403 is configured to: determine to adjust the network parameter configuration based on the first network configuration parameter when the configuration change response includes an identifier of the first physical layer resource; or, determine to adjust the network parameter configuration based on a second network configuration parameter corresponding to a second physical layer resource when the configuration change response includes an identifier of the second physical layer resource; or, determine not to adjust the network parameter configuration when the configuration change response includes a back off indication.

In some embodiments of the disclosure, the transmission unit 401 is further configured to retransmit the configuration change request to the base station through the first physical layer resource after a duration indicated by the back off indication.

In some embodiments of the disclosure, the apparatus further includes: an acquiring unit 404, configured to acquire configuration information of the terminal device; and a processing unit 405, configured to determine the first network configuration parameter corresponding to the configuration information of the terminal device based on the correspondence between configuration information and network configuration parameters.

In some embodiments of the disclosure, the configuration information includes a power preference indication.

In some embodiments of the disclosure, the reception unit 402 is further configured to receive a correspondence between network configuration parameters and physical layer resources from the base station.

In some embodiments of the disclosure, the reception unit 402 is configured to receive a radio resource control signaling, a media access control layer signaling or a broadcast packet from the base station, in which the radio resource control signaling, the media access control layer signaling or the broadcast packet may carry the correspondence between network configuration parameters and physical layer resources.

In some embodiments of the disclosure, the reception unit 402 is configured to receive a physical downlink control channel order from the base station, in which the physical downlink control channel order may carry the correspondence between network configuration parameters and physical layer resources.

In some embodiments of the disclosure, the configuration change request may further include a user identifier of the terminal device when the first physical layer resource is a resource shared by at least two terminal devices.

In some embodiments of the disclosure, the determining unit 403 is configured not to adjust the network parameter configuration when the configuration change response is not received for more than a preset duration.

For the manner in which the transmission unit 401 transmits the physical layer resource corresponding to the first network configuration parameter, reference is made to the action in block S33; for the manner in which the reception unit 402 receives the instruction from the base station, reference is made to the action in block S35; for the manner in which the determining unit 403 determines whether to adjust the network parameter configuration, reference is made to the action in block S37, and the detailed description is omitted here.

Figure 7:
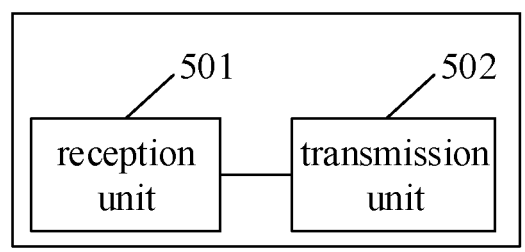
FIG. 7 is a block diagram illustrating an apparatus for configuring a network parameter according to an exemplary embodiment.

FIG. 7 is a block diagram illustrating an apparatus for configuring a network parameter according to an exemplary embodiment. Referring to FIG. 7, the apparatus may include a reception unit 501 and a transmission unit 502.

The reception unit 501 is configured to receive a configuration change request from a terminal device through a first physical layer resource, in which the first physical layer resource is a physical layer resource corresponding to a first network configuration parameter, and the first network configuration parameter is a target network configuration parameter requested by the terminal device. The transmission unit 502 is configured to transmit a configuration change response to the terminal device, the configuration change response for indicating whether to employ the first network configuration parameter to adjust network parameter configuration.

In some embodiments of the disclosure, the first physical layer resource may include at least one of a physical layer time resource, a physical layer frequency resource, a physical layer spatial domain resource, and a physical layer code resource.

In some embodiments of the disclosure, the configuration change response may include an identifier of the first physical layer resource when the configuration change response is configured to indicate to adjust the network parameter configuration based on the first network configuration parameter; or, the configuration change response may include an identifier of a second physical layer resource when the configuration change response is configured to indicate to adjust the network parameter configuration based on a second network configuration parameter corresponding to the second physical layer resource; or, the configuration change response may include a back off indication when the configuration change response is configured to indicate not to adjust the network parameter configuration.

In some embodiments of the disclosure, the transmission unit 502 is configured to transmit a correspondence between network configuration parameters and physical layer resources to the terminal device.

In some embodiments of the disclosure, the transmission unit 502 is configured to transmit a radio resource control signaling, a media access control layer signaling or a broadcast packet to the terminal device, in which the radio resource control signaling, the media access control layer signaling or the broadcast packet may carry the correspondence between network configuration parameters and physical layer resources.

In some embodiments of the disclosure, the transmission unit 502 is configured to transmit a physical downlink control channel order to the terminal device, in which the physical downlink control channel order may carry the correspondence between network configuration parameters and physical layer resources.

Optionally, when the correspondence between network configuration parameters and physical layer resources corresponds to a group of terminal devices, and the group of terminal devices includes at least two terminal devices, the transmission unit 502 is configured to transmit the configuration change response to other terminal device in the group of terminal devices.

The manner in which the reception unit 501 receives the configuration change request, reference is made to the action in block S33; the manner in which the transmission unit 502 transmits the configuration change response, reference is made to the action in block S35, and the detailed description is omitted here.

Figure 8:
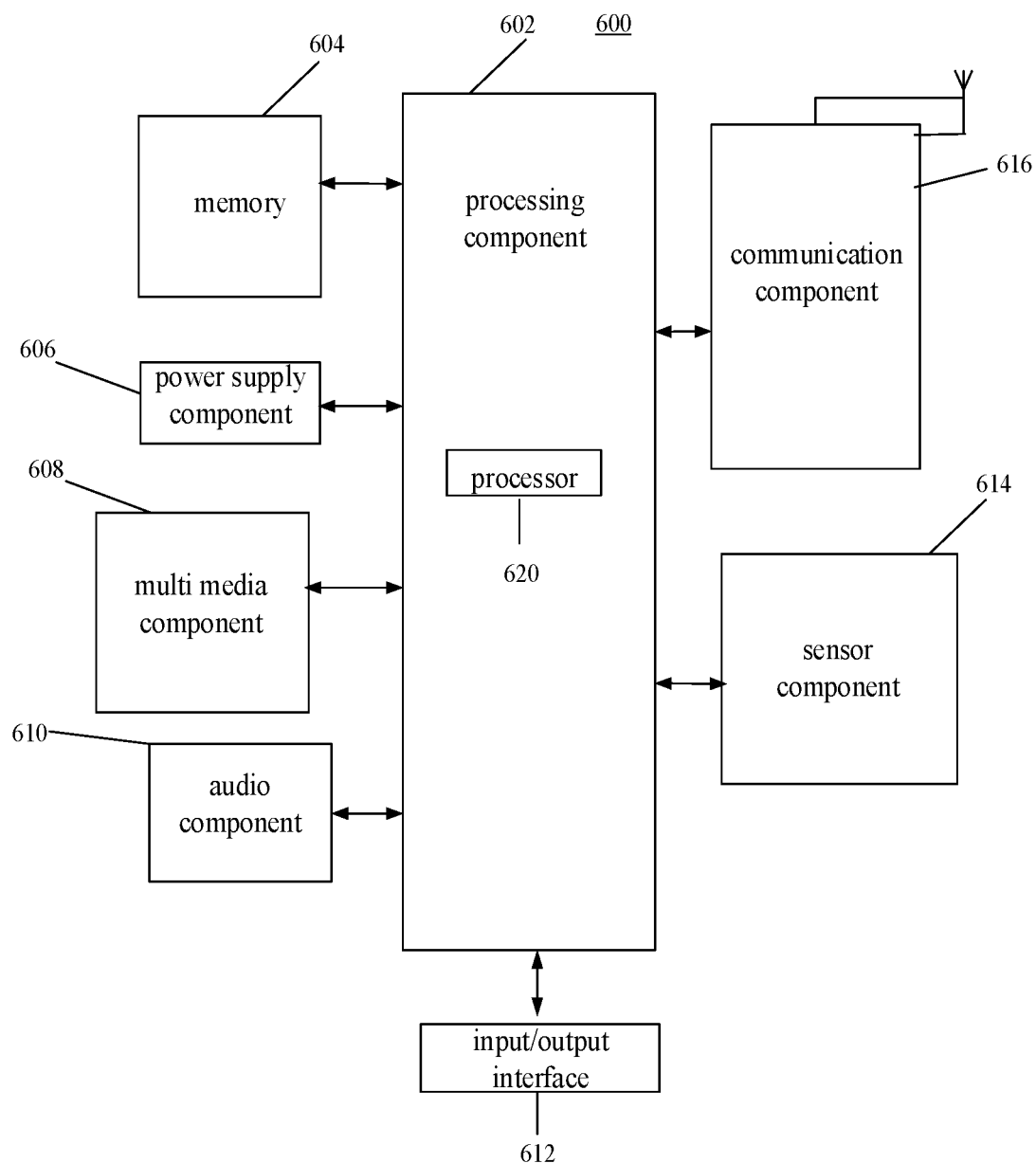
FIG. 8 is a block diagram illustrating a device for configuring a network parameter according to an exemplary embodiment.

FIG. 8 is a block diagram illustrating a device 600 for configuring a network parameter according to an exemplary embodiment. The device 600 may be the terminal device mentioned above. Referring to FIG. 8, the device 600 may include one or more of the following components: a processing component 602, a memory 604, a power supply component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above methods. In addition, the processing component 602 may include one or more modules to facilitate the interaction between the processing component 602 and other components. For example, the processing component 602 may include a multimedia module to facilitate the interaction between the multimedia component 608 and the processing component 602.

The memory 604 is configured to store various types of data to support operations on the device 600. Examples of these data include instructions for any application or method operating on the device 600, such as contact data, phone book data, messages, pictures, videos, and so on. The memory 604 can be implemented by any type of volatile or non-volatile storage device or their combination, such as static Random Access Memory (SRAM), Electrically Erasable Programmable Read-Only Memory (EEPROM), Erasable and Programmable Read-Only Memory (EPROM), Programmable Read-Only Memory (PROM), Read-Only Memory (ROM), magnetic memory, flash memory, magnetic disk or optical disk.

The power supply component 606 provides power for various components of the device 600. The power supply component 606 may include a power management system, one or more power supplies, and other components associated with the generation, management, and distribution of power for the device 600.

The multimedia component 608 includes a screen that provides an output interface between the device 600 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC). When the device 600 is in an operation mode, such as a call mode, a recording mode, and a voice recognition mode, the microphone is configured to receive external audio signals. The received audio signal may be further stored in the memory 604 or transmitted via the communication component 616. In some embodiments, the audio component 610 further includes a speaker to output audio signals.

The I/O interface 612 provides an interface between the processing component 602 and the peripheral interface module. The peripheral interface module may be a keyboard, a click wheel, a button, and so on. These buttons may include but are not limited to: home button, volume button, start button, and lock button.

The sensor component 614 includes one or more sensors to provide status assessments of various aspects of the device 600. For example, the sensor component 614 may detect the on/off state of the device 600 and relative position of components, for example, components as the display and the keypad of the device 600. The sensor component 614 may also detect changes of the position of the device 600 or one component of the device 600, and the presence or absence of contact between a user and the device 600, the position or acceleration/deceleration of the device 600, and the temperature change of the device 600. The sensor component 614 may include a proximity sensor configured to detect the presence of nearby objects without any physical contact. The sensor component 614 may also include a light sensor, such as a CMOS or CCD image sensor for the imaging applications. In some embodiments, the sensor component 614 may also include an acceleration sensor, a gyroscope sensor, a magnetic sensor, a pressure sensor or a temperature sensor.

The communication component 616 is configured to facilitate wireless communication between the device 600 and other devices. In the embodiments of the disclosure, the communication component 616 may realize network parameter configuration through getting access to a wireless network based on the communication standard, such as 2G, 3G, 4G or 5G, or their combinations. In one exemplary embodiment, the communication component 616 receives a broadcast signal or broadcast associated information from an external broadcast management system via a broadcast channel. Optionally, the communication component 616 may also include an NFC module.

In an exemplary embodiment, the device 600 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above method for configuring a network parameter.

In exemplary embodiments, there is also provided a non-transitory computer-readable storage medium including instructions, such as included in the memory 604, executable by the processor 620 in the device 600, for performing the above method. For example, the non-transitory computer-readable storage medium may be a ROM, a RAM, a CD-ROM, a magnetic tape, a floppy disc, an optical data storage device, and the like.

Figure 9:
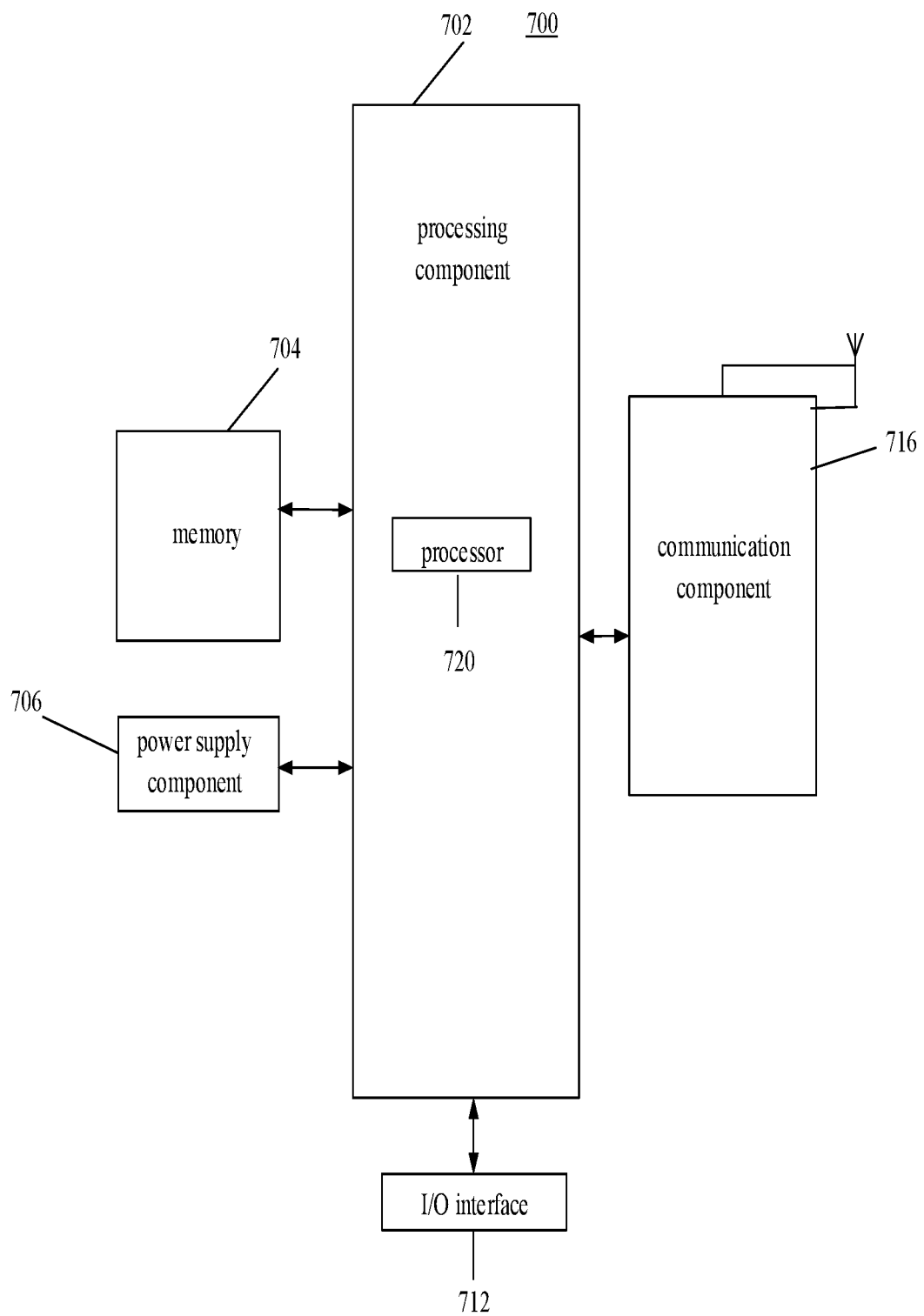
FIG. 9 is a block diagram illustrating a device for configuring a network parameter according to an exemplary embodiment.

FIG. 9 is a block diagram illustrating a device 700 for configuring a network parameter according to an exemplary embodiment. The device 700 may be the base station mentioned above. Referring to FIG. 9, the device 700 may include one or more of the following components: a processing component 702, a memory 704, a power supply component 706, an input/output (I/O) interface 712, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above methods. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support operations on the device 700. Examples of these data include instructions for any application or method operating on the device 700, such as contact data, phone book data, messages, pictures, videos, and so on. The memory 704 can be implemented by any type of volatile or non-volatile storage device or their combination, such as static Random Access Memory (SRAM), Electrically Erasable Programmable Read-Only Memory (EEPROM), Erasable and Programmable Read-Only Memory (EPROM), Programmable Read-Only Memory (PROM), Read-Only Memory (ROM), magnetic memory, flash memory, magnetic disk or optical disk.

The power supply component 706 provides power for various components of the device 700. The power supply component 706 may include a power management system, one or more power supplies, and other components associated with the generation, management, and distribution of power for the device 700.

The I/O interface 712 provides an interface between the processing component 702 and the peripheral interface module. The peripheral interface module may be a keyboard, a click wheel, a button, and so on. These buttons may include but are not limited to: home button, volume button, start button, and lock button.

The communication component 716 is configured to facilitate wireless communication between the base station and other devices. In the embodiments of the disclosure, the communication component 716 may connect with the terminal device by providing a wireless network based on the communication standard, such as 2G, 3G, 4G or 5G, or their combinations.

In an exemplary embodiment, the device 700 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above method for configuring a network parameter.

In exemplary embodiments, there is also provided a non-transitory computer-readable storage medium including instructions, such as included in the memory 704, executable by the processor 720 in the device 700, for performing the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structure described above and shown in the drawings, and various modifications and changes can be made without departing from its scope. The scope of the disclosure is only limited by the appended claims.

What is claimed is:

1. A method for configuring a network parameter, comprising:

transmitting, by a terminal device, a configuration change request to a base station through a first physical layer resource, the first physical layer resource being a physical layer resource corresponding to a first network configuration parameter, and the first network configuration parameter being a target network configuration parameter requested by the terminal device;

receiving a configuration change response from the base station, the configuration change response for indicating whether to employ the first network configuration parameter to adjust a discontinous reception (DRX); and determining whether to adjust the DRX period based on the configuration change response;

wherein the determining whether to adjust the DRX period based on the configuration change response comprises:

determining to adjust the DRX period based on the first network configuration parameter when the configuration change response comprises an identifier of the first physical layer resource; or determining to adjust the DRX period based on a second network configuration parameter corresponding to a second physical layer resource when the configuration change response comprises an identifier of the second physical layer resource.

2. The method of claim 1, wherein the first physical layer resource comprises at least one of a physical layer time resource, a physical layer frequency resource, a physical layer spatial domain resource, and a physical layer code resource.

3. The method of claim 1, further comprising:
receiving a correspondence between network configuration parameters and physical layer resources from the base station.

4. The method of claim 3, wherein receiving the correspondence between network configuration parameters and physical layer resources from the base station comprises one of:
receiving a radio resource control signaling, a media access control layer signaling or a broadcast packet from the base station, the radio resource control signaling, the media access control layer signaling or the broadcast packet carrying the correspondence between network configuration parameters and physical layer resources; or
receiving a physical downlink control channel order from the base station, wherein the physical downlink control channel order carrying the correspondence between network configuration parameters and physical layer resources.

5. The method of claim 3, wherein the configuration change request further comprises a user identifier of the terminal device when the first physical layer resource is a resource shared by at least two terminal devices.

6. The method of claim 1, further comprising:
determining not to adjust the DRX period when the configuration change response is not received for more than a preset duration.

7. The method of claim 1, further comprising:
acquiring configuration information of the terminal device; and
determining the first network configuration parameter corresponding to the configuration information based on a correspondence between configuration information and network configuration parameters.

8. The method of claim 7, wherein the configuration information comprises power preference indication (PPI), the correspondence comprises a correspondence between PPIs and discontinuous reception (DRX) periods; and the first network configuration parameter comprises a DRX period corresponding to the PPI based on the correspondence between PPIs and DRX periods.

9. The method of claim 8, wherein receiving the configuration change response from the base station comprises:
receiving the configuration change response determined by the base station based on a preset algorithm,
wherein the preset algorithm comprises that when the network configuration parameter comprises the DRX period, the base station considers whether the DRX period guarantees mobile robustness requirements of the terminal device based on a location of the terminal device to transmit the configuration change response to the terminal device.

10. A method for configuring a network parameter, comprising:
receiving, by a base station, a configuration change request from a terminal device through a first physical layer resource, the first physical layer resource being a physical layer resource corresponding to a first network configuration parameter, and the first network configuration parameter being a target network configuration parameter requested by the terminal device; and
transmitting a configuration change response to the terminal device, the configuration change response for indicating whether to employ the first network configuration parameter to adjust a discontinuous reception (DRX) period;
wherein the configuration change response comprises an identifier of the first physical layer resource when the configuration change response is configured to indicate to adjust the DRX period based on the first network configuration parameter; or, the configuration change response comprises an identifier of a second physical layer resource when the configuration change response is configured to indicate to adjust the DRX period based on a second network configuration parameter corresponding to the second physical layer resource.

11. The method of claim 10, wherein the first physical layer resource comprises at least one of a physical layer time resource, a physical layer frequency resource, a physical layer spatial domain resource, and a physical layer code resource.

12. The method of claim 10, further comprising:
transmitting a correspondence between network configuration parameters and physical layer resources to the terminal device.

13. The method of claim 12, wherein transmitting the correspondence between network configuration parameters and physical layer resources to the terminal device comprises one of:
transmitting a radio resource control signaling, a media access control layer signaling or a broadcast packet to the terminal device, wherein the radio resource control signaling, the media access control layer signaling or the broadcast packet carrying the correspondence between network configuration parameters and physical layer resources; or
transmitting a physical downlink control channel order to the terminal device, the physical downlink control channel order carrying the correspondence between network configuration parameters and physical layer resources.

14. The method of claim 12, wherein when the correspondence between network configuration parameters and physical layer resources corresponds to a group of terminal devices, and the group of terminal devices comprises at least two terminal devices, the method further comprises:
transmitting the configuration change response to other terminal device in the group of terminal devices.

15. The method of claim 10, wherein the first network configuration parameter comprises a DRX period.

16. The method of claim 15, wherein transmitting the configuration change response to the terminal device comprises:
transmitting the configuration change response to the terminal device based on a preset algorithm.

17. The method of claim 16, wherein the preset algorithm comprises: when the network configuration parameter comprises the DRX period, the base station considers whether the DRX period guarantees mobile robustness requirements of the terminal device based on a location of the terminal device to transmit the configuration change response to the terminal device.

18. A device for configuring a network parameter, comprising:
a processor; and
a memory configured to store instructions executable by the processor;
wherein the processor is configured to:
transmit a configuration change request to a base station through a first physical layer resource, the first physical layer resource being a physical layer resource corresponding to a first network configuration parameter, and the first network configuration parameter being a target network configuration parameter requested by the terminal device;

receive a configuration change response from the base station, the configuration change response for indicating whether to employ the first network configuration parameter to adjust a discontinuous reception (DRX) period; and determine whether to adjust the DRX period based on the configuration change response;

wherein the processor is further configured to determine to adjust the DRX period parameter based on the first network configuration parameter when the configuration change response comprises an identifier of the first physical layer resource; or, determine to adjust the DRX period based on a second network configuration parameter corresponding to a second physical layer resource when the configuration change response comprises an identifier of the second physical layer resource.

* * * * *